United States Patent [19]

Sugawa

[11] Patent Number: 5,371,610
[45] Date of Patent: Dec. 6, 1994

[54] IMAGE DATA PROCESSING APPARATUS

[75] Inventor: Hiroya Sugawa, Toyokawa, Japan

[73] Assignee: Minolta Camera Kabushiki Kaisha, Osaka, Japan

[21] Appl. No.: 642,688

[22] Filed: Jan. 17, 1991

[30] Foreign Application Priority Data

| Jan. 19, 1990 [JP] | Japan | 2-11138 |
| Jan. 19, 1990 [JP] | Japan | 2-11139 |
| Jan. 19, 1990 [JP] | Japan | 2-11140 |
| Jan. 19, 1990 [JP] | Japan | 2-11141 |

[51] Int. Cl.$^5$ ............... H04N 1/00; H04N 1/387; H04N 1/46
[52] U.S. Cl. ............... 358/434; 358/453; 358/538
[58] Field of Search ............... 358/400, 434, 438, 443, 358/448, 452, 453, 455, 456, 457, 462, 465, 75, 78, 500, 504, 515, 538

[56] References Cited

U.S. PATENT DOCUMENTS 4,750,044 6/1988 Nakajima .
4,896,208 1/1990 Moriya et al. .
4,905,091 2/1990 Suzuki et al. .................. 358/78
4,998,122 3/1991 Kanno et al. .................. 358/462
5,189,523 2/1993 Sugiura et al. ................ 358/453
5,289,270 2/1994 Hayashi ........................ 358/500

FOREIGN PATENT DOCUMENTS 62-12279 1/1987 Japan .

Primary Examiner—Edward L. Coles, Sr.
Assistant Examiner—Thomas D. Lee
Attorney, Agent, or Firm—Burns, Doane, Swecker & Mathis

[57] ABSTRACT

An image processing apparatus determines an image data of a selected area to be an image such as of characters having no halftone or an image such as of a photograph having halftones. An image processing mode optimal to the image data of the selected area is assigned to this area as attribute data. Based on the attribute data, the image data of the selected area is processed in the optimal mode. Each of such area includes at least one pixel, and an overall result of image processing carried out in respective optimal modes is output.

27 Claims, 22 Drawing Sheets

IMAGE DATA PROCESSING APPARATUS

BACKGROUND OF THE INVENTION

1. Field of the Invention

The present invention relates to an image data processing apparatus for processing image data, and outputting the processed image data.

2. Description of Related Art

An image reader for reading an original by fragmenting it into pixels has been conventionally used as an image input device for a digital copying machine or facsimile machine, an OCR (optical character reader), an optical filing system, and a variety of display devices which form, store, and display an image by a combination of pixels having a fixed size.

With this type of image reader, image information is quantized and handled as digital image data to carry out various image processing with ease. Generally, the image reader is constructed for image processing to improve image quality such as by emphasizing edges (contours) for clear definition of an image and smoothing for a natural image, and for image processing to enable image editing.

Known image editing operations include trimming for extracting only a particular area of an original, masking for blanking a particular area, reversing between negative and positive (black and white), and color conversion for changing a particular color portion into a different color.

U.S. Pat. No. 4,750,044, for example, discloses an image reader capable of image editing which includes an attribute memory for storing attribute data corresponding to the nature of image processing. Attribute data corresponding to small image areas into which an original is segmented are stored in the attribute memory in advance, and image processing based on the attribute data is carried out in real time in parallel with image reading.

With this image reader, types of image processing may be designated for the respective image areas to enable complicated and diverse image editing.

As is well known, to realize high quality reproduction images in the image processing of binary multivalue data corresponding to density levels of respective pixels in an original (hereinafter referred to as binarizing processing), simple binarizing processing in which the multivalue level of one pixel is compared with a fixed threshold level is suited for line images such as characters. Pseudo-tone processing based on the dither method or error diffusion method, on the other hand, is better suited for halftone images such as photographs.

It is therefore necessary, when reading an original having a mixture of line images and halftone images, to change the binary processing modes in accordance with attributes of the images indicating whether the images are line images or halftone images (hereinafter referred to as binary attributes).

There are image readers including a device for discriminating the binary attributes by various methods as disclosed in Japanese Patent Publication Kokai No. 62-39978 and other publications. The image readers capable of color editing such as color conversion include a device for discriminating color attributes of images.

Since conventional image readers output only image data after it has been processed, attribute data used for processing are not output. Accordingly, there is a problem when an operator or an external apparatus handling the image data received from the image reader does not recognize how the image data has been processed.

SUMMARY OF THE INVENTION

The present invention has been made with regard to the state of the art noted above, and its object is to provide an image data processing apparatus which can output attribute data as well as image data having been processed.

The above object is fulfilled, according to the present invention by an image processing apparatus comprising generating means for generating attribute data indicative of information relating to image data processing based on image data representing at least one pixel included in a predetermined area; processing means for processing the image data based on the attribute data; and output means for outputting processed image data and the attribute data to the external device.

An image processing mode optimal to image data of a selected area is assigned to this area as attribute data. Based on the attribute data, the image processing means processes the image data of the selected area in the optimal mode, thereby assuring a high image quality. The attribute data for determining the image processing mode may include trimming, masking and negative/positive reversal commands.

The foregoing and other objects, features and advantages of the invention will be apparent from the following more particular description of preferred embodiments of the invention, as illustrated in the accompanying drawings.

Figure 1:
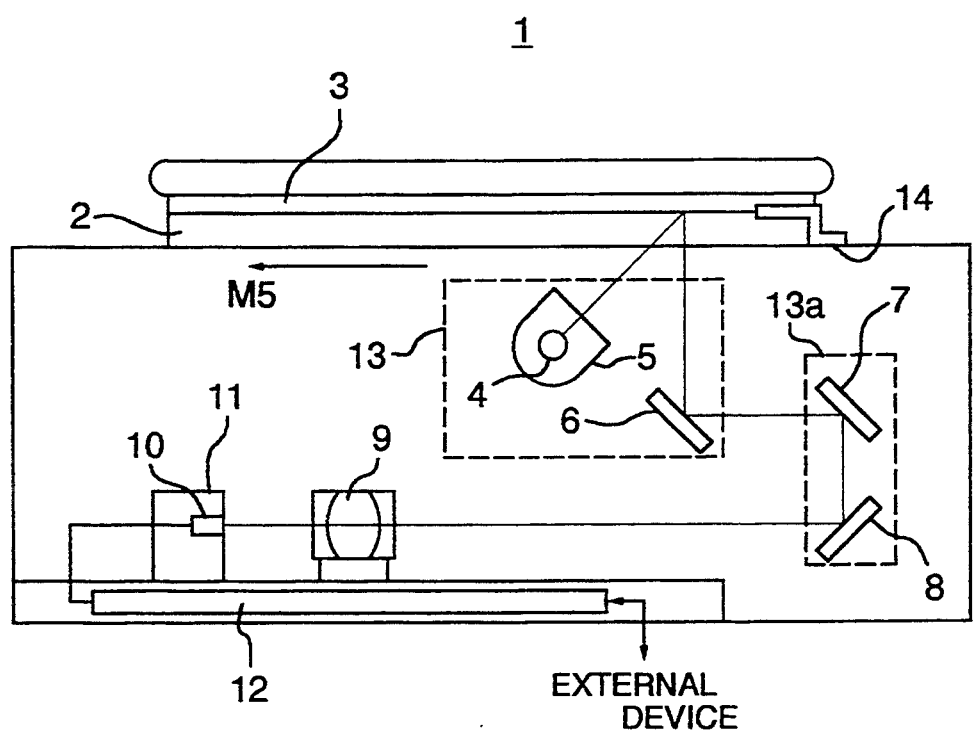
FIG. 1 is a sectional front view schematically showing an image reader according to the present invention.

What is illustrated in the drawings with a "∼" may be described in the specification using a "—".

DESCRIPTION OF THE PREFERRED EMBODIMENTS

FIG. 1 is a sectional front view schematically showing an image reader according to the present invention, The image reader 1 comprises a glass plate 2 acting as an original table attached to a top face of a box-shaped body for supporting originals whose maximum size is A3 in DIN standard. An original placed thereon is pressed down by an original cover 3. The glass plate 2 has a reference pattern 14 of a white image for shading correction mounted at a forward end in a scanning direction.

The box-shaped member contains an optical system arranged to scan the original in a direction of arrow M5 (an auxiliary scanning direction), and an electric circuitry 12 for generating image data corresponding to density levels of images on the original.

The optical system includes a first slider 13 having an exposure lamp 4, a reflecting mirror 5 and a mirror 6, a second slider 13a having mirrors 7 and 8, and a main lens 9. Assuming that the first slider 13 is movable at a velocity v, the second slider 13a is movable at a velocity v/2.

Scanning light having passed through the main lens 9 impinges upon an image sensor 10 mounted on a support 11, where the light is converted into an electric signal. The image sensor 10 includes a plurality of CCD chips arranged continuously in a main scanning direction for reading originals with a resolution of 400 pixels per inch. Each CCD chip has a plurality of light receiving elements arranged in a row. Each light receiving element is divided into three regions, and has a spectrofilter covering a surface thereof so that each region receives one of the three colors, R (red), G (green) and B (blue). One light receiving element corresponds to one pixel in an original, and each light receiving element outputs a photoelectric conversion signal to the electric circuitry 12, the signal corresponding to an intensity level of reflected light for a single color of each pixel in the original.

Figure 2:
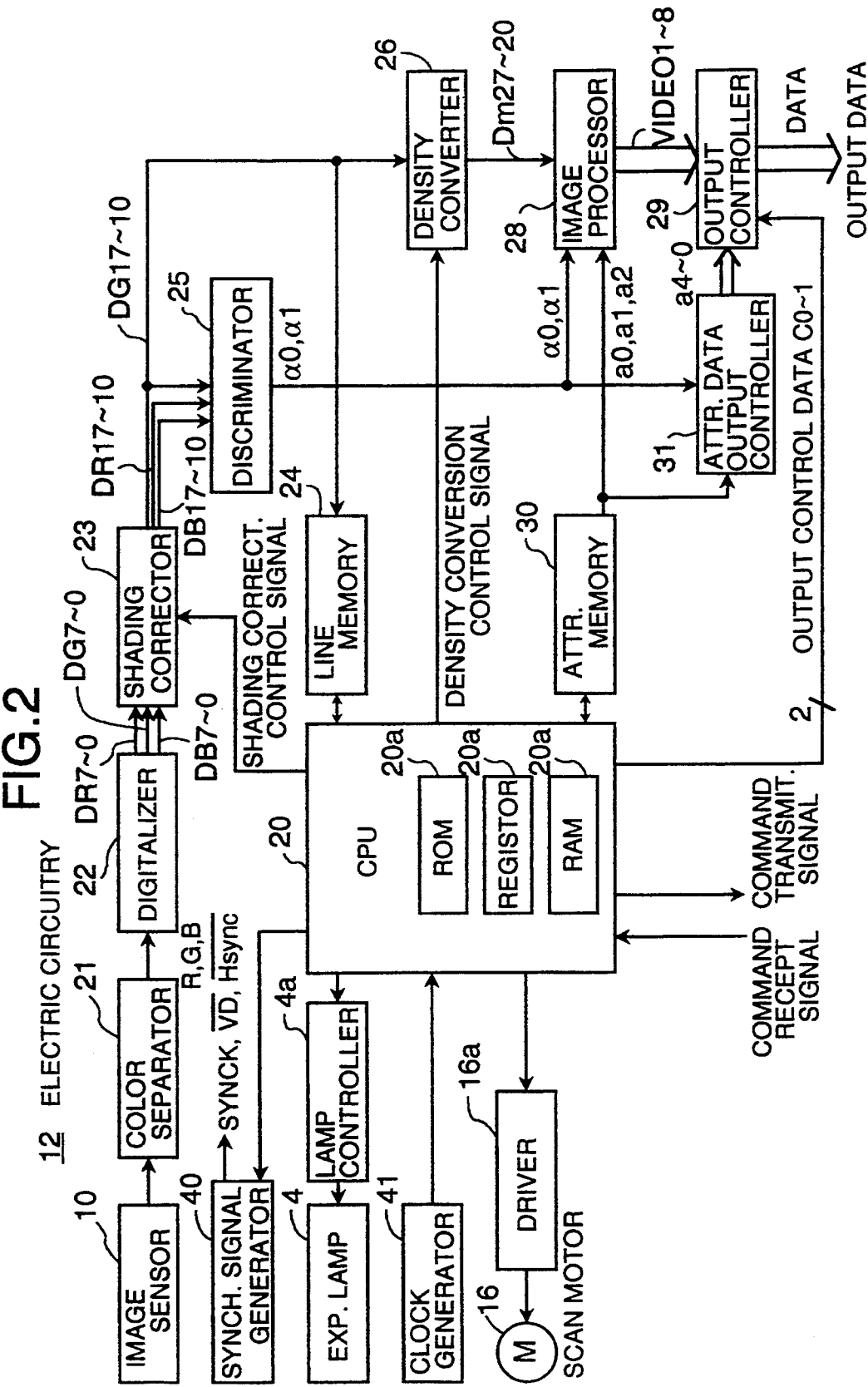
FIG. 2 is a block diagram of electric circuitry included in the image reader.

FIG. 2 is a block diagram of the electric circuitry 12.

The electric circuitry 12 includes a color separator 21 for separating the photoelectric conversion signal received from the image sensor 10 into R, G and B color signals and amplifying the latter to a suitable level, a digitalizer 22 for effecting A/D conversion (quantization) of the respective analog signals and outputting 8-bit image data DR7-0, DG7-0 and DB7-0 of the respective colors, a shading corrector 23 for correcting intensity variations in the main scanning direction of the color image data DR7-0, DG7-0 and DB7-0 and variations among the bits of the image sensor 10, an image discriminator 25 for discriminating binary attributes and color attributes, a density converter 26 for effecting density level adjustment and Y conversion according to density characteristics (Y characteristics) of external devices connected to the image reader, an image processor 28 for effecting image processing including image editing and binarization, an output controller 29 for controlling data output, an attribute memory 30 for storing designated attribute data aj (j=0, 1, 2) which will be described later, an attribute data output controller 31, a clock generator 41, a line memory 24 for storing image data DG17-10 for one line output from the shading corrector 23, a synchronizing signal generator 40 for outputting various synchronizing signals to various components, a lamp controller 4a for controlling on/off operations of the exposure lamp 4, a driver 16a for driving a scan motor 16, and a CPU 20 for effecting overall controls of the circuitry.

The CPU 20 includes a ROM 20a for storing processing programs, and a register 20b and a RAM 20c for temporarily storing various flags and status data. The CPU 20 communicates various commands (control command code data) and data showing an operating condition (status) of the image sensor 10 with an external host apparatus having a control device manipulated by an operator. In response to a command received, the CPU 20 generates designated attribute data aj specifying image processing and binarizing processing and stores the data in the attribute memory 30 prior to reading of an original.

The synchronizing signals output from the synchronizing signal generator 40 include a horizontal synchronizing signal $\overline{\text{Hsync}}$ output for each main scan line, a pixel clock signal SYNCK for providing a reference for pixel by pixel data transmission timing, and an enable signal $\overline{\text{VD}}$ showing validity periods of data output from the image sensor 10.

Figure 3A:
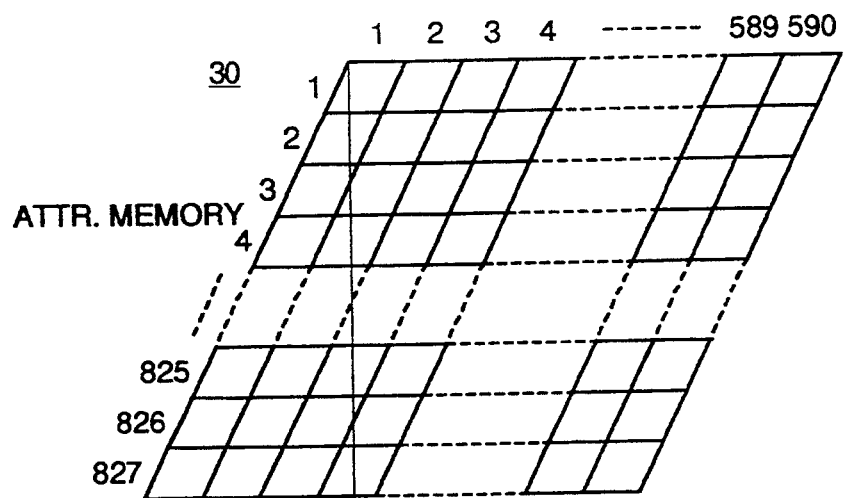
FIGS. 3A and 3B are views showing the construction of an attribute memory.
Figure 3B:
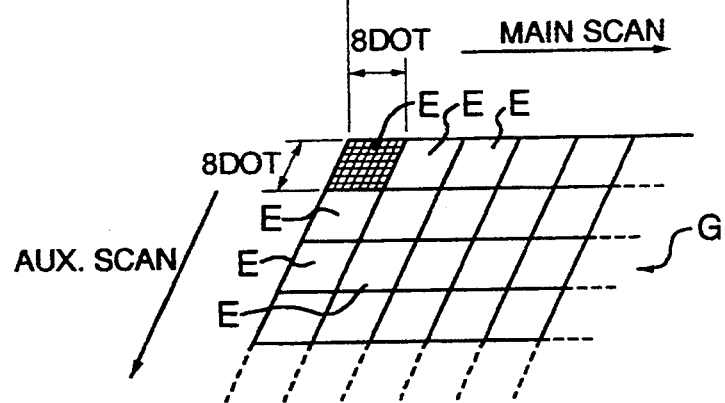

FIGS. 3A and 3B are views showing the construction of the attribute memory 30.

As shown in FIG. 3B, the attribute memory 30 is constructed to store the designated attribute data aj generated by the CPU 20 in each segmented area E comprising an 8×8 dot matrix corresponding to a portion of an image G segmented into 8 pixels in the main and auxiliary scanning directions.

In the image sensor 10, designated attribute data a0 specifies the binarizing processing, while designated attribute data a1 and a2 specify negative/positive reversal and trimming, respectively.

Figure 4:
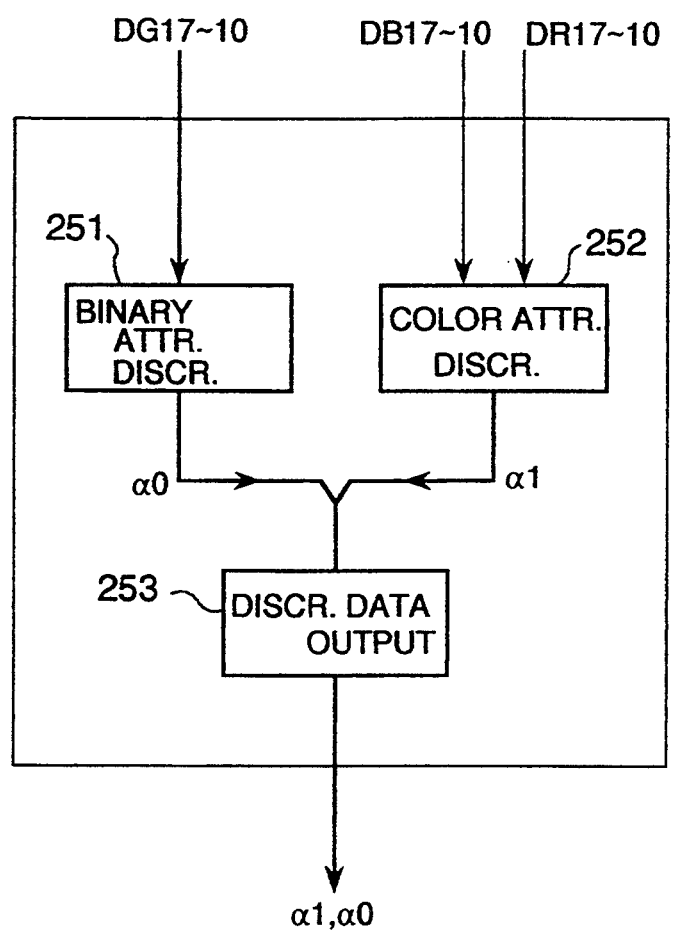
FIG. 4 is a block diagram of an image discriminator.

FIG. 4 is a block diagram of the image discriminator 25.

The image discriminator 25 includes a binary attribute discriminating section 251, a color attribute discriminating section 252 and a discriminated data output 253.

The binary attribute discriminating section 251 discriminates binary attributes for each segmented area E, i.e. whether the segmented area E corresponds to a character image or to a halftone image, and outputs a 1-bit discriminated attribute data α0.

The binary attribute discriminating section 251 detects density variations in the segmented area to discriminate between a character and a halftone. That is, in the case of a character, there is a clear distinction between a thin black line and a white base of the original document. Consequently, the density variations in the segmented area is outstanding. In the case of a halftone image (photograph), the same density often prevails throughout the segmented area. Thus, the variations in density, i.e. edge components of image data read, are detected for discriminating between a character and a halftone.

Figure 5:
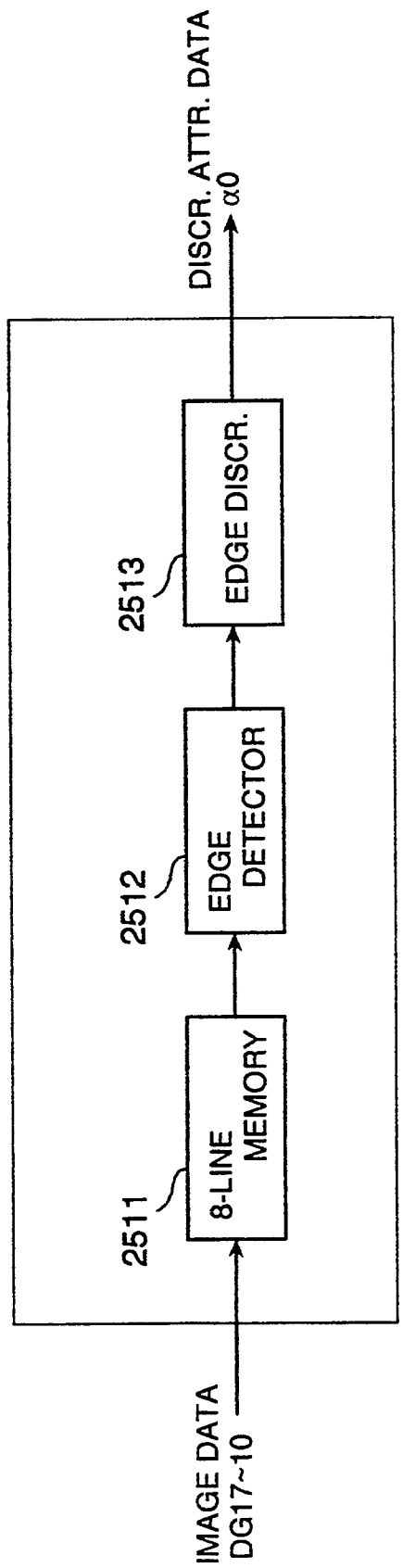
FIG. 5 is a block diagram of a binary attribute discriminator.

The binary attribute discriminating section 251 receives image data DG17-DG10 (G type image data) which, as shown in FIG. 5, are once stored in an 8-line memory 2511 to discriminate the segmented section E. The data stored in this memory are successively input to an edge detector 2512 for detecting edge components of an area corresponding to the segmented area E, the result being output as an edge detection amount. The edge detection amount is input to an edge discriminator 2513, from which the discriminated attribute α0 is output, i.e. an indication "character area" when the edge detection amount is greater than a discriminant threshold level, and an indication "halftone" area" when the detection amount is less than the threshold level.

The color discriminating section 252 discriminates color attributes for each segmented area E, i.e. whether the segmented area E corresponds to a particular color image or not, and outputs a 1-bit discriminated attribute data α1 indicating a result of discrimination.

The color attribute discriminating section 252 detects a color density condition of the segmented area to discriminate a particular color. That is, the image signal data separated into the three colors, R, G and B, have different levels according to the color of the image read. A particular color is determined by detecting a combination of the level differences.

Figure 6:
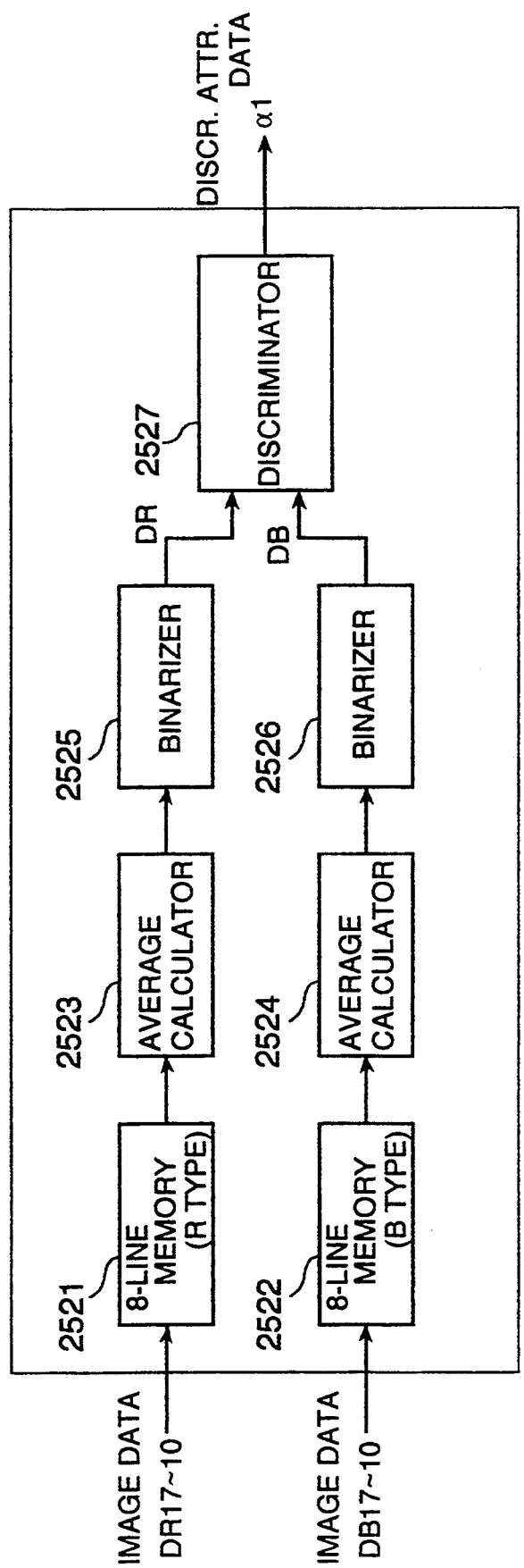
FIG. 6 is a block diagram of a color attribute discriminator.

In this embodiment, the color attribute discriminating section is shown in block diagram in which the particular color is "red". As shown in FIG. 6, the color attribute discriminating section receives the image data DR17-DR10 (R type image data) and DB17-DB10 (B type image data) which are once stored in 8-line memories 2521 and 2522, respectively, to discriminate the segmented section E. The data stored in the memories are successively input to average detector 2523 and 2524. The average detectors read image data corresponding to the segmented area E from the 8-line memories, and output averages derived from the pixel data (for 8×8=64 pixels). The output averages of the respective color types are input to binarizers 2525 and 2526, respectively, which output "0" or "1" (R type output being referenced DR and B type output DB). This binarizing step is carried out to facilitate the discriminating operation to follow. That is, "1" is output when the average is greater than a predetermined threshold level, and "0" when the average is less than the threshold level. The outputs DR and DB from the digitalizers are input to a discriminator 2527, which outputs the discriminated attribute data (color attribute data) α1 based on a combination of input data DR and DB as set out in the following table:

|    |   | DR                   |                           |
|----|---|----------------------|---------------------------|
|    |   | 0                    | 1                         |
| DB | 0 | a1 = 0 (black char.  | a1 = 1 (part. color, red) |
|    | 1 | a1 = 0 (blue)        | a1 = 0 (white, base)      |

The discriminated attribute data (α0 is "0" when the segmented area E discriminated corresponds to a character image, and "1" when the area E corresponds to a halftone image. The discriminated attribute data α1 is "1" when the segmented area E discriminated corresponds to the particular color, and "0" when the area E corresponds to a different color.

Figure 7:
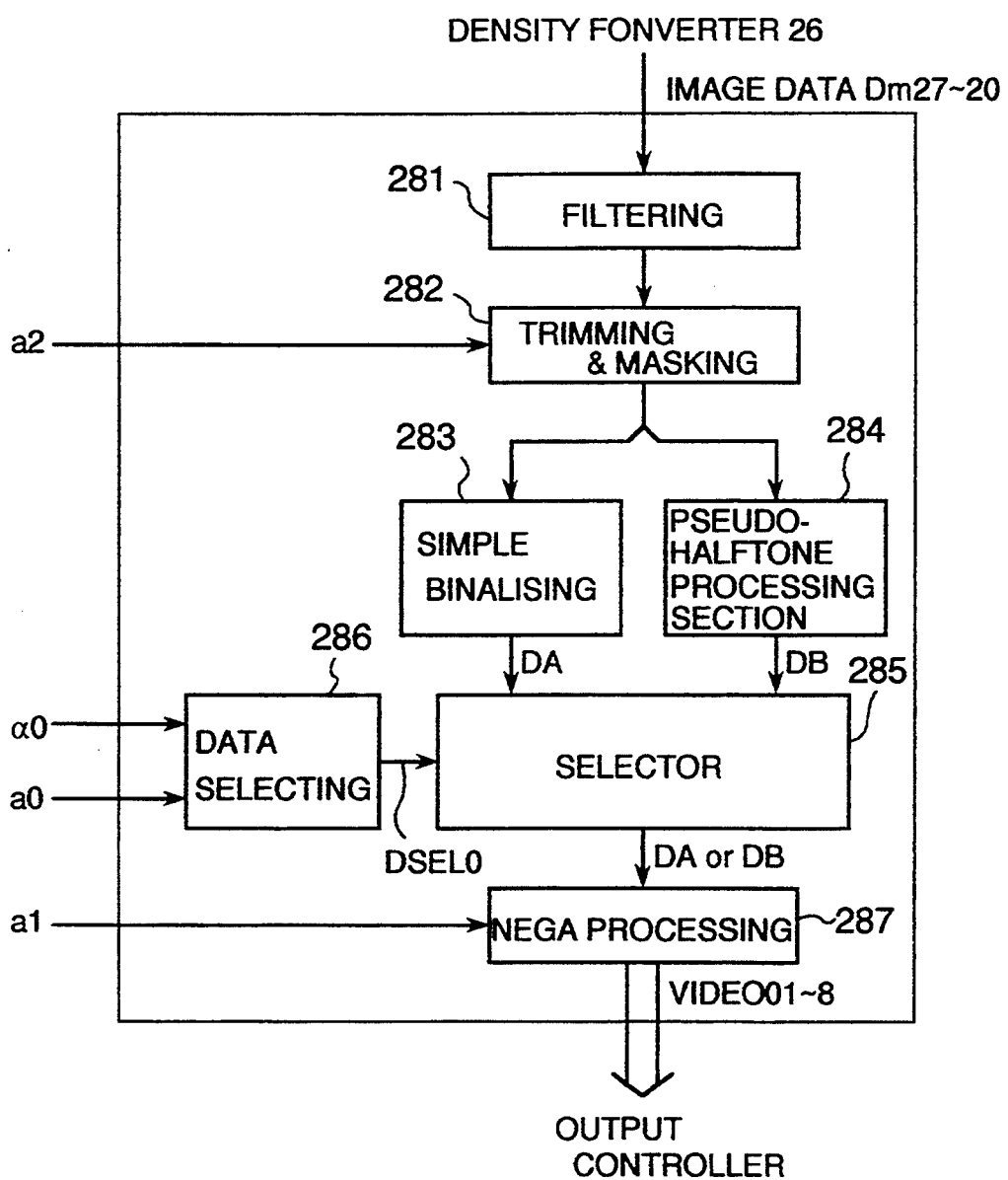
FIG. 7 is a block diagram of an image processor.

FIG. 7 is a block diagram of the image processor 28.

The image processor 28 includes a filtering section 281, a trimming and masking section 282, a simple binarizing section 283, a pseudo-halftone processing section 284, a data selecting section 286, a selector 285 and a negative processing section 287.

The image processor 28 receives image data Dm27-20 transmitted serially in the order of pixel arrangement from the density converter 26. The input image data Dm27-20 are first subjected to processing for improvement of image quality such as edge highlighting and smoothing at the filtering section 281. Next, the trimming and masking section 282 operable in response to designated attribute data a2 carries out masking processing and outputs "0" corresponding to a blank portion when the data a2 is "1". When the data a2 is "0", it is output as it is from the trimming and masking section 282 (data through).

The image data output from the trimming and masking section 282 are binarized at the simple binarizing section 283 and pseudo-halftone processing section 284, respectively, and input simultaneously to the selector 285 as the binary image data DA and DB.

The selector 285, in response to an output data DSEL0 from the data selecting section 286, selectively outputs one of the binary data DA and DB.

The data selecting section 286 receives designated attribute data a0 for controlling the binarizing processing, along with the discriminated attribute data α0 resulting from the automatic discrimination of the binary attributes. The value of output data is determined according to the value of data a0. That is, if the data a0 is "0", the discriminated attribute data α0 is output as it is. If the data a0 is "1", the discriminated attribute data α0 is output as reversed. Thus, when the data a0 is "0", the binarizing processing designation applied from outside is regarded as a default and the image processor 28 outputs binary image data based on the binary attributes automatically discriminated by the image discriminator 25. When the data a0 is "1", binary image data having undergone binarizing processing different from the result of the automatic discrimination of binary attributes.

The negative processing section 287 outputs the binary image data as received from the selector 285 if the specified attribute data a1 is "0", and as reversed if the data a1 is "1". The negative processing section 287 successively outputs the data in the form of parallel video data VIDEO01-08 in units of 8 pixels.

To enable image discrimination for each segmented area E, the image processor 28 further includes a line memory for storing image data Dm27-20 for 8 lines, not shown, and an 8-bit serial/parallel converter, not shown.

Figure 8:
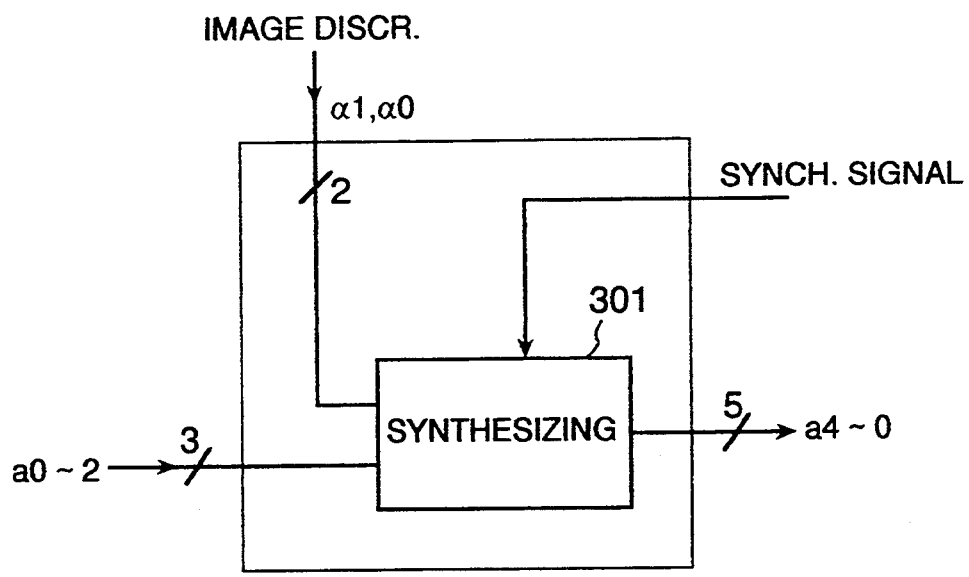
FIG. 8 is a block diagram of an attribute data output controller.

FIG. 8 is a block diagram of the attribute data output controller 30.

This control 30 includes a synthesizing section 301 for combining the discriminated attribute data α0, α1 and designated attribute data aj, and outputting 5-bit attribute data a4-0.

The attribute data a4 and a3 correspond to the discriminated attribute data α0 and α1, respectively.

Figure 9:
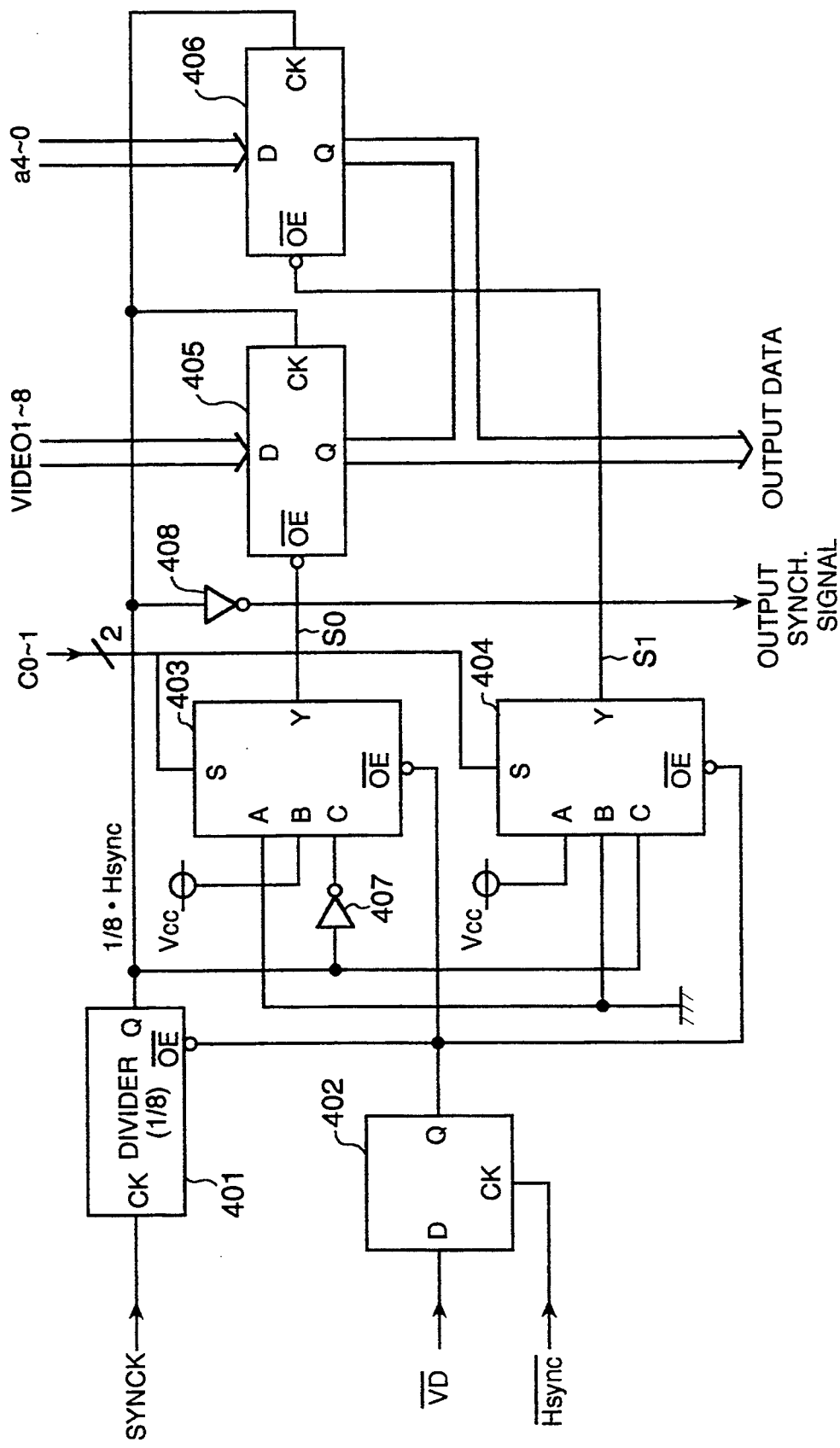
FIG. 9 is a block diagram of an output controller.
Figure 10:
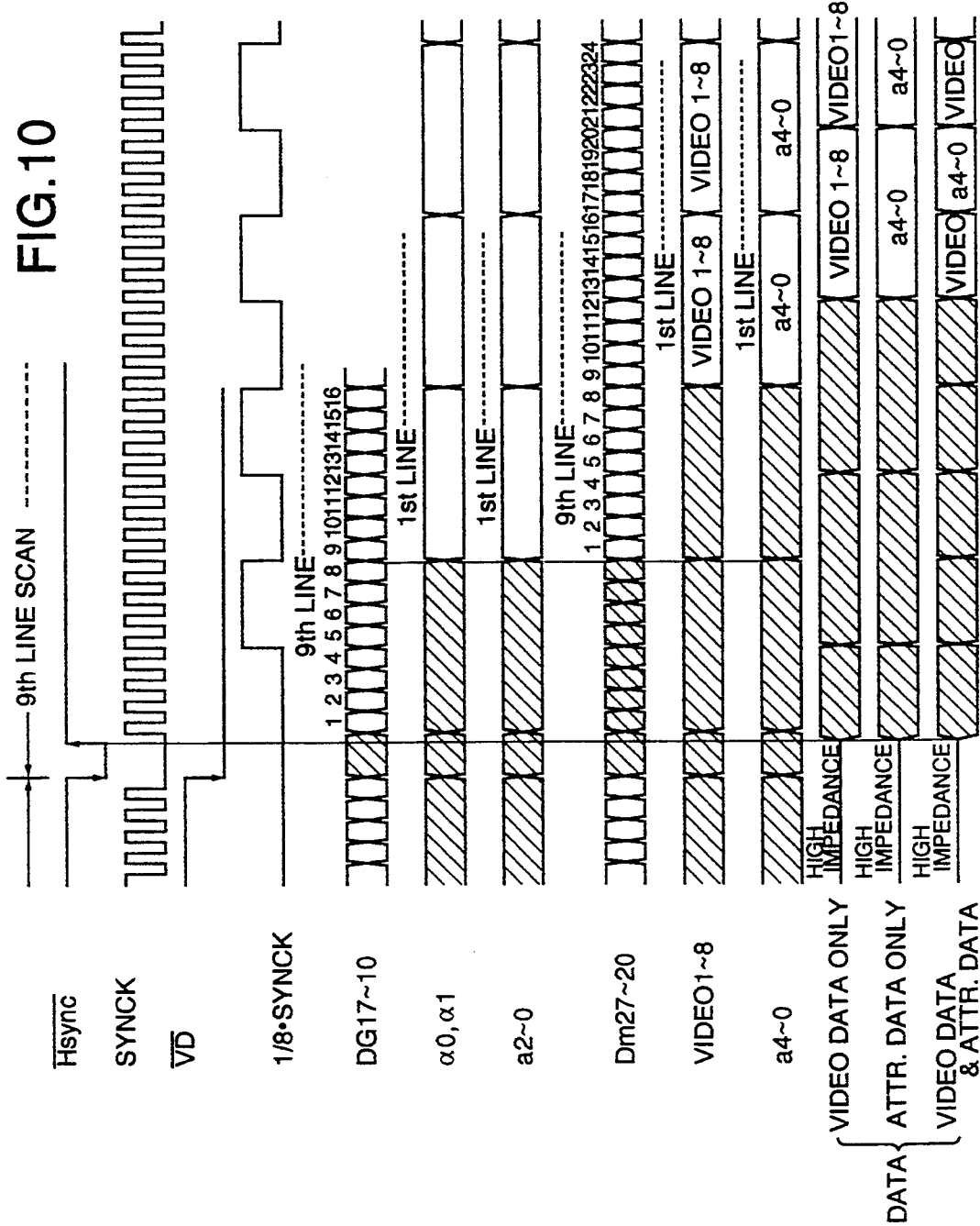
FIG. 10 is a timing chart showing an attribute data outputting operation.

FIG. 9 is a block diagram of the output controller 29, and FIG. 10 is a timing chart showing an operation for outputting the attribute data a4-0.

The output controller 29 includes a divider 401 for outputting a signal ⅛.Hsync which is one eighth of the signal SYNCK, a latch circuit 402 for latching the signal $\overline{VD}$ in accordance with the signal $\overline{Hsync}$, selectors 403 and 404 for outputting control signals S0 and S1 in response to output control data C0-1 from the CPU 20, respectively, and data latch circuits 405 and 406 operable under control of the signals S0 and S1 to select video data VIDEO1-8 or attribute data a4-0 to be output data DATA, respectively.

The signal ⅛ Hsync is input to clock terminals CK of the data latch circuits 405 and 406, applied as it is as an optional input to the selector 404 and as inverted by an inverter 407 as an optional input to the selector 404, and output externally through an inverter 408 as an output synchronizing signal DSYNC.

When the signal $\overline{VD}$ becomes active ("L"), the divider 401, and selectors 403 and 404 output signals ⅛.Hsync, S0 and S1, respectively, to enable output of the output data DATA.

An operation for outputting the output data DATA will be described referring to FIG. 10 and FIG. 2 also.

When scanning of the document is started, the color image data DR17-10, DG17-10 and DB17-10 of the leading pixel on the first line and onward are input to the image discriminator 25, the data DG17-10 being input to the density converter 26 as well. Since image discrimination is effected for each segmented area E embracing eight lines as noted hereinbefore, the image discriminator 25 stores the color image data DR17-10, DG17-10 and DB17-10 of eight lines. Consequently, the image discriminator 25 outputs invalid data during a scan up to the eighth line. In FIG. 10, the invalid data are marked with hatching. Thus, the signal $\overline{VD}$ becomes "L" in synchronism with the signal $\overline{Hsync}$ indicating start of a scan of the ninth line. The image discriminator 25 outputs the discriminated attribute data $\alpha 0$ and $\alpha 1$ corresponding to the segmented area E including the first line in synchronism with the signal ↓.HSync after input of the color image data DR17-10, DG17-10 and DB17-10 of the first eight pixels on the ninth line.

The attribute memory 30 outputs the designated attribute data a2-0 with the same timing as output of the discriminated attribute data $\alpha 0$ and $\alpha 1$.

On the other hand, a delay corresponding to eight dots occurs at the density converter 26.

As a result, image data Dm27-20 of the ninth line are input to the image processor 28 with a delay corresponding to eight dots compared with the image discriminator 25. Since a delay corresponding to eight lines as noted above occurs at the image processor 28 also, image processing for the image data Dm27-20 of the first line is completed at a point of time at which the image data Dm27-20 of the ninth line are input. Further, a delay due to the serial/parallel conversion occurs at the image processor 28, and therefore the video data VIDEO1-8 corresponding to the first line are output in parallel in units of eight pixels with a further delay corresponding to eight dots after the input for the ninth line.

The attribute data output controller 31 outputs the attribute data a4-0 in timed relationship with the output of the video data VIDEO1-8.

The video data VIDEO1-8 and attribute data a4-0 thus output are latched by the data latch circuits 405 and 406 of the output controller 29, respectively, at the timing of a rise of the signal ↓.Hsync. However, the data latch circuits 405, 406 do not output the latched data constantly from their output terminals Q, the data output being controlled by signals S0 and S1 corresponding to output control data C0 and C1 of 2 bits in total provided by the CPU 20 (active flow).

When the output control data C0 and C1 are both "0", the signal S0 is set to "L" (grounding level), and the signal S1 to "H" (Vcc level). Consequently, the data latch circuit 405 becomes an output enable condition while the output terminal of the data latch circuit 406 becomes a high impedance condition. Then, the output controller 29 outputs the video data VIDEO1-8 as the output data DATA in the order of scanning.

When the output control data C0 is "1" and output control data C1 is "0", the signals S0 and S1 are set to "H" and "L", respectively. As a result, the attribute data a4-0 are successively output as the output data DATA.

When the output control data C0 is "0" and output control data C1 is "1", the signals S0 and S1 are set to "H" or "L" depending on the signal ↓.Hsync. As a result, the video data VIDEO1-8 and attribute data a4-0 are alternately output as the output data DATA.

Thus, by setting the output control data C0 and C1 by command designation from the host apparatus, the image reader 1 outputs the video data VIDEO1-8 as a normal mode, outputs the attribute data a4-0 for redesignating an area for image editing purposes, or alternately outputs the video data VIDEO1-8 and attribute data a4-0 for displaying an image and its attributes at the same time to enable confirmation of image discrimination. In this way, an output selection may be made in accordance with the purpose of using the output data DATA or the data processing mode at a receiving side.

As shown in FIG. 10, the image reader 1 outputs the video data VIDEO1-8 and attribute data a4-0 alternately in half a cycle of outputting the video data VIDEO1-8 only or attribute data a4-0 only. Thus, the period for outputting the video data VIDEO1-8 is never extended by output of the attribute data a4-0. The attribute data a4-0 are output through the same signal line as the video data VIDEO1-8, and there is no need for a special signal line for outputting the attribute data a4-0.

The way in which the image reader 1 operates will be described next with reference to the flowcharts shown in FIGS. 11 through 20.

Figure 11:
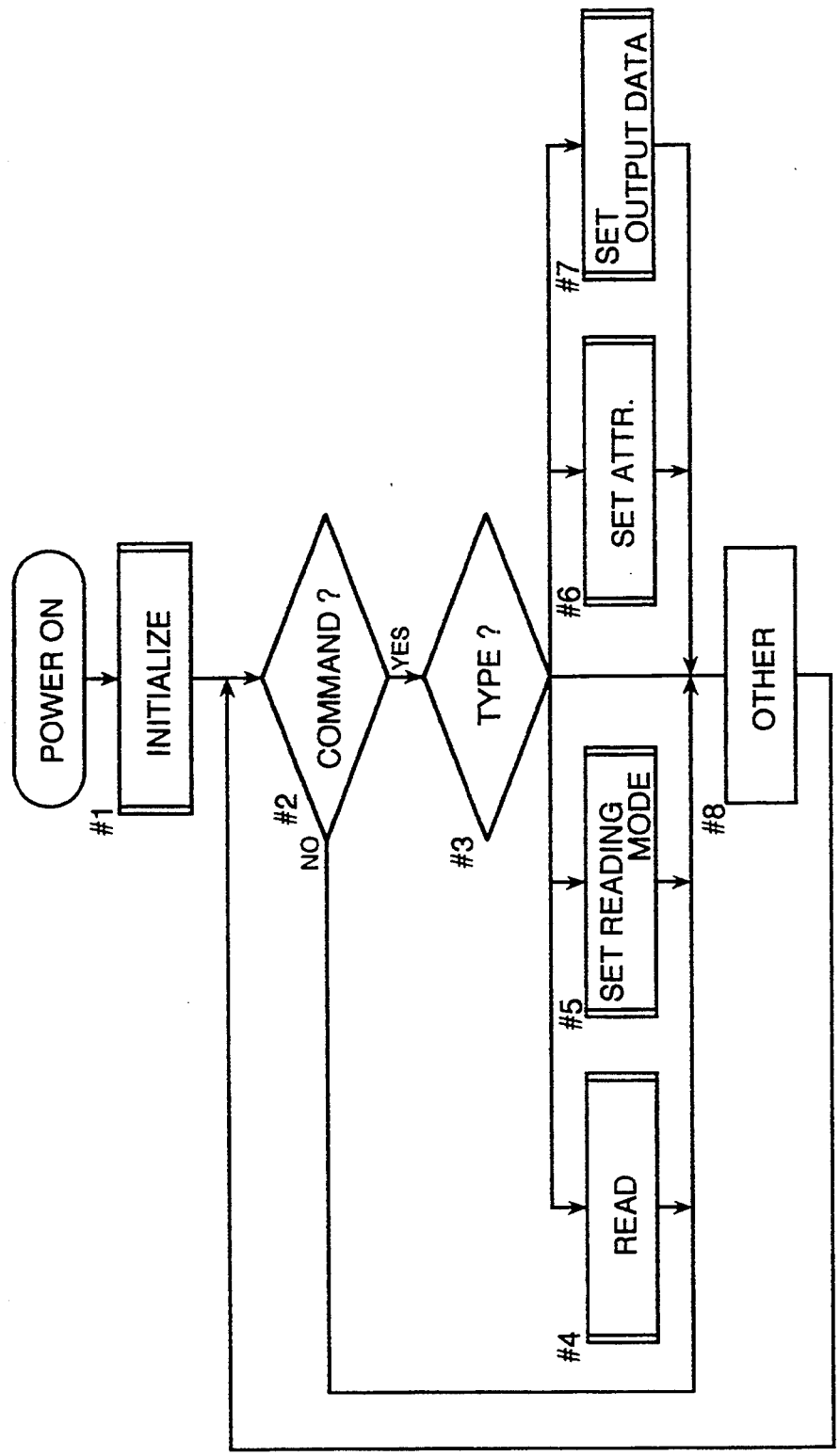
FIGS. 11 through 20 are flowcharts showing operations of the image reader.

FIG. 11 is a main flowchart schematically showing operations of the CPU 20.

When the image reader 1 is turned on and the program is started, initialization is carried out first at step #1.

Then, step #2 is executed to check presence or absence of a command from the host apparatus. If there is a command, the type of the command is determined (step #3). Depending on the type of the command, a reading process (step #4), a reading mode setting process (step #5), an attribute setting process (step #6) or an output data setting process (step #7) is carried out.

Thereafter, other processing (step #8) is carried out and the program returns to step #2 for repeating the steps #2 through #8.

Figure 12:
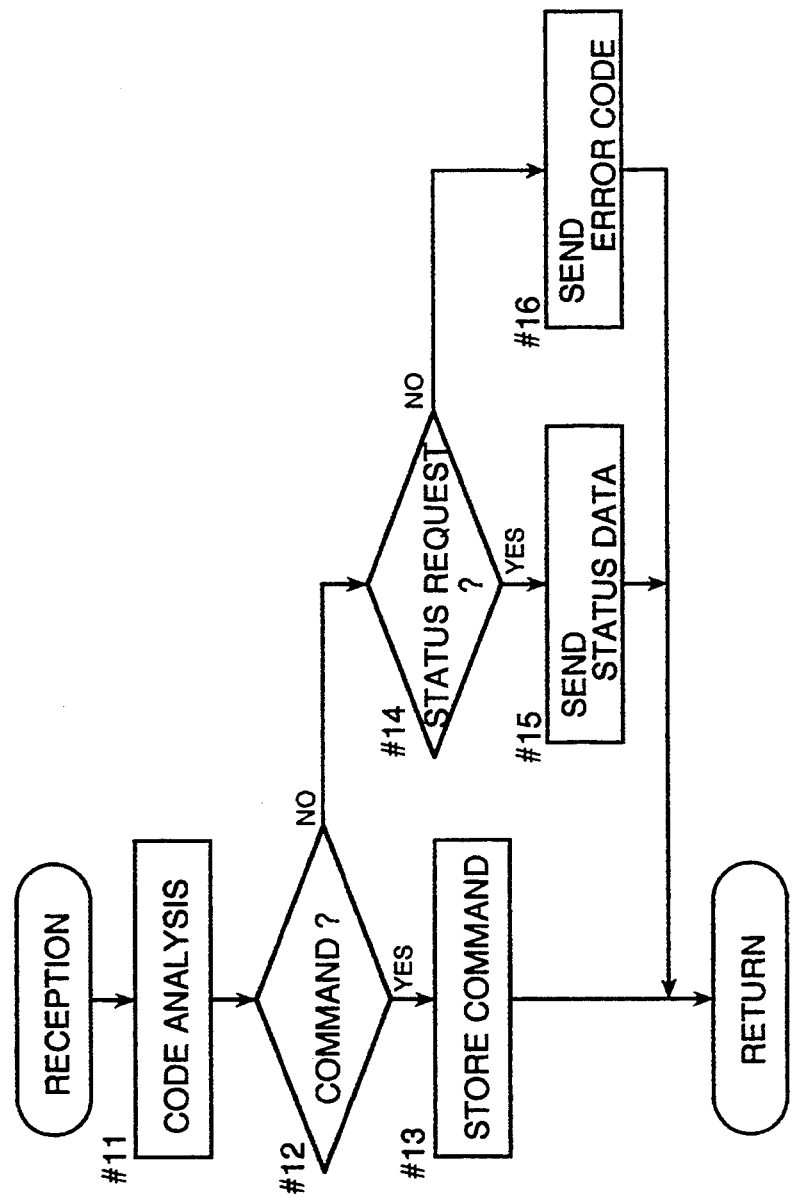
Figure 13:
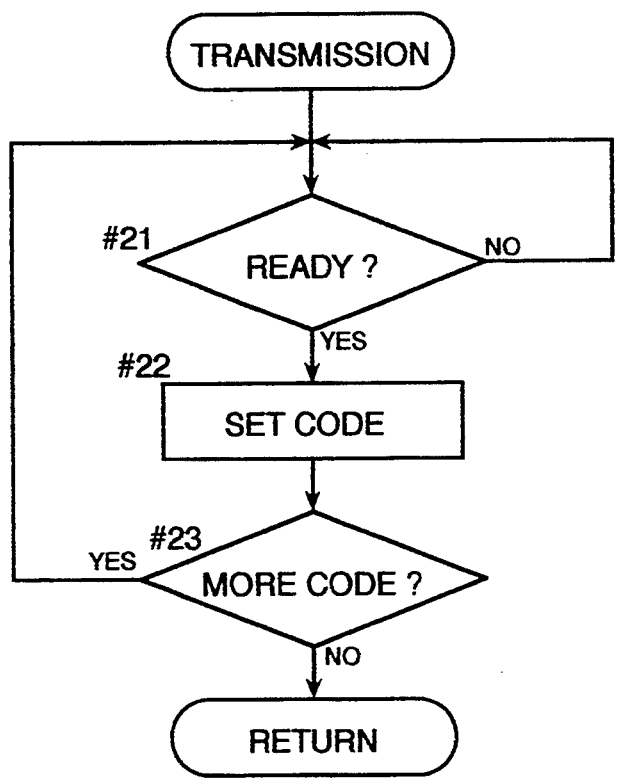

FIG. 12 is a flowchart of reception processing, and FIG. 13 is a flowchart of transmission processing.

These routines are interrupt routines carried out upon access made by the host apparatus as necessary.

In the reception processing shown in FIG. 12, a code analysis is carried out of a signal received (step #11) If reception of a command is confirmed at step #12, the received command is stored in a predetermined region in the register 20b (step #13).

If the received signal requests a status notification (step #14), a status data indicating a standby state or a wait state is read from the register 20b for transmission to the host apparatus.

If the received signal agrees with none of predetermined commands and status requests, a code data indicating a reception error is transmitted at step #16.

In the transmission processing shown in FIG. 13, the program waits for completion of a transmission allowing a next transmission (step #21). A code data for transmission is set to the register 20b (step #22).

Thereafter, step #23 is executed to check if there is a further code data to be transmitted, i.e. whether a transmission is necessary. If a transmission is necessary, the program returns to step #21.

Figure 14:
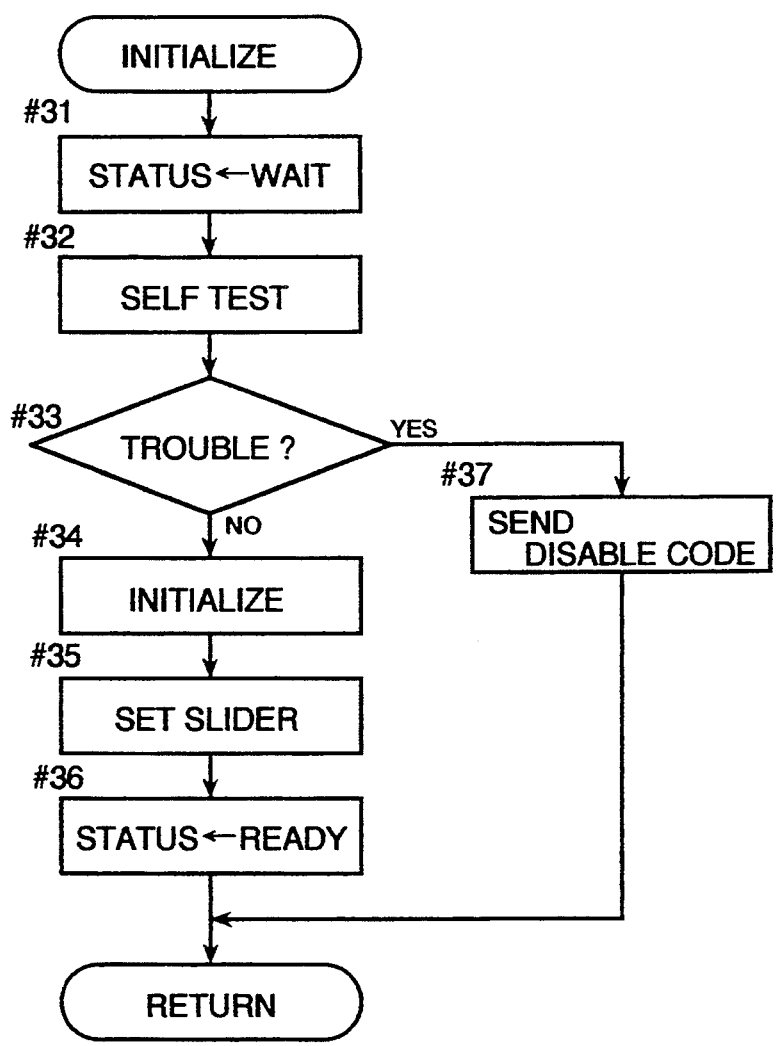

FIG. 14 is a flowchart of initialization carried out at step #1 in FIG. 11.

First, "wait" is set as a status to indicate that preparations for a scanning and reading operation are under way. That is, a data corresponding to "wait" is stored in a region for status in the register 20b (step #31).

Then, at step #32, a self test is carried out to check if all the components are operating normally.

Next, step #33 is executed to check if there is trouble. If a trouble is found, the program moves to step #37 for transmitting a disable code to the host apparatus.

In the absence of trouble, the program moves to step #34 for initializing the components. At this time "0" is written to the attribute memory 30 as designated attribute data a0, a1 and a2. Consequently, unless the designated data a0–a2 are rewritten, the image processor 28 does not effect image editing for trimming or negative/-positive reversal, and the binarizing processing is carried out on the basis of the discriminated attribute data a0.

The density converter 26 is set for standard density. For the output controller 29, inputs to the selectors 403 and 404 are selected for the video data VIDEO1-8 and attribute data a4-0 to be output alternately.

After the initialization, step #35 is executed to move the first slider 13 to home position. Upon completion of this movement, step #36 is executed to change the status from "wait" to "ready" indicating a standby state.

Figure 15:
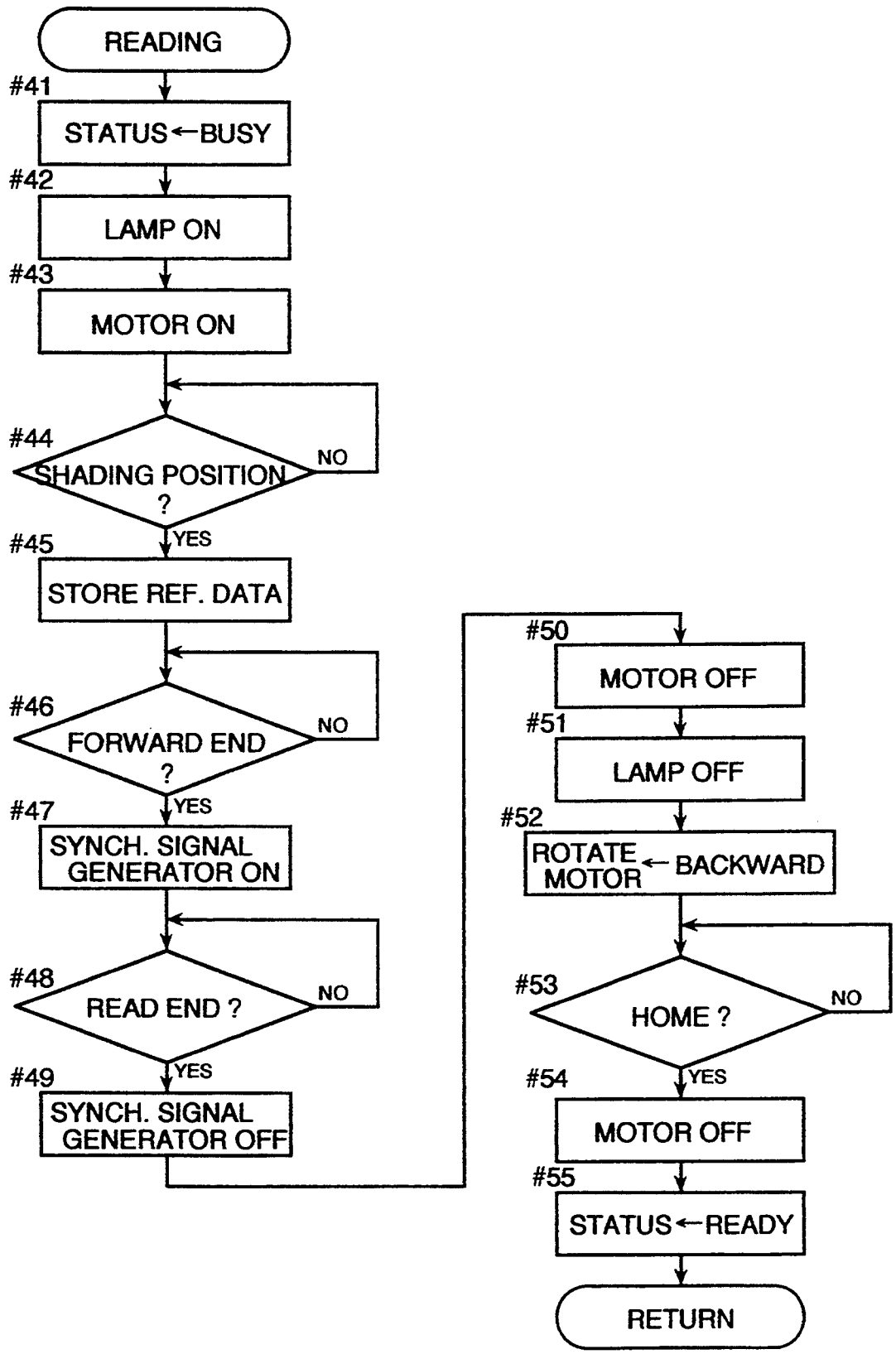

FIG. 15 is a flowchart of the reading process mentioned hereinbefore.

First, "busy" is set to the status to indicate that a reading operation is in progress (step #41), and the exposure lamp 4 is lit (step #42).

Next, the scan motor 16 is turned on (step #43). The program waits for the first slider 13 to reach a shading position, i.e. a position directly under the reference pattern 14 (step #44).

When the first slider 13 reaches the reference pattern 14, the reference pattern 14 is read for a shading correction. The reference image data (white data) is stored in the line memory 24 (step #45).

Subsequently, at step #46, the program waits for the first slider 13 to reach the forward end of the document. At step #47, the synchronizing signal generator 40 is turned on to output the synchronizing signal. Then, various components come into operation in response to the synchronizing signal. After start of scanning of the ninth line, effective video data VIDEO1-8 and attribute data a4-0 are output alternately as described hereinbefore.

The program waits for completion of scanning of the document, i.e. for the first slider 13 to reach the rear end of the document (step #48). Then, the synchronizing signal generator 40 is turned off (step #49), the scan motor 16 is turned off for once (step #50), and the exposure lamp 4 is turned off (step #51).

Subsequently, the scan motor 16 is rotated backward to return the two sliders 13 and 13a (step #52). The program waits for the first slider 13 to return to home position (step #53). Then, the scan motor 16 is turned off (step #54) and, finally at step #55, "ready" is set to the status.

Figure 16:
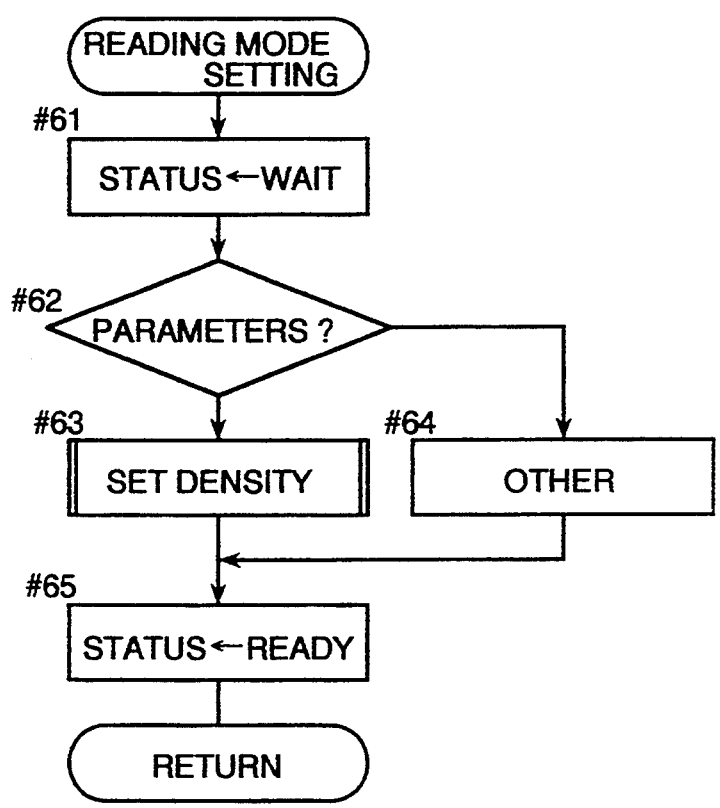

FIG. 16 is a flowchart of the reading mode setting carried out at step #5 in FIG. 11.

At step #61, "wait" is set to the status. At step #62, parameters included in the command are checked. Depending on the parameters, density setting (step #63) or other setting such as designation of an output device or the like (step #64) is carried out. At step #65, "ready" is set to the status.

Figure 17:
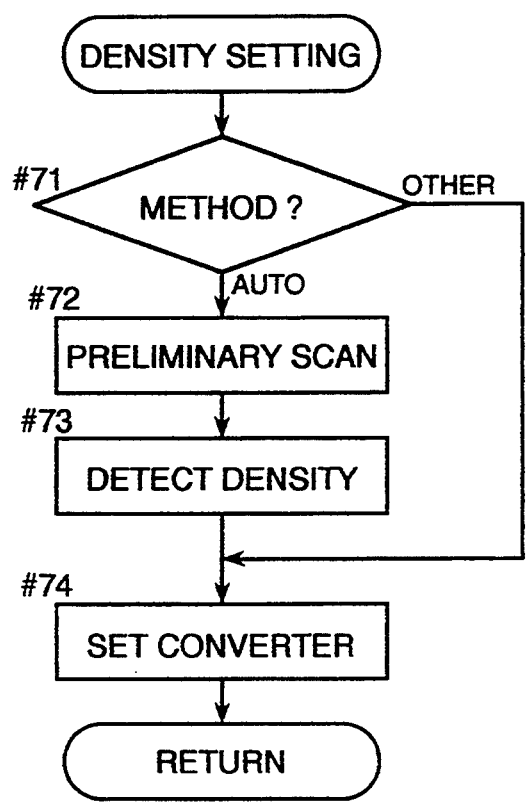

FIG. 17 is a flowchart of the density setting carried out at step #63.

At step #71, checking is made whether a density level is to be set automatically or not. If the setting is not to be made automatically, the program jumps to step #74 for setting the density converter 26 in accordance with parameters transmitted from the host apparatus based on a designating operation by the operator.

If step #71 finds the method to be automatic, step #72 is executed to effect a preliminary scan for detecting density of the document and transfer the image data DG17-10 successively stored in the line memory 24 to the RAM 20c as appropriate. At step #73, the density of the document is detected from the data in the RAM 20c. Thereafter, step #74 is executed to set the density converter 26 in accordance with the detection results.

Figure 18:
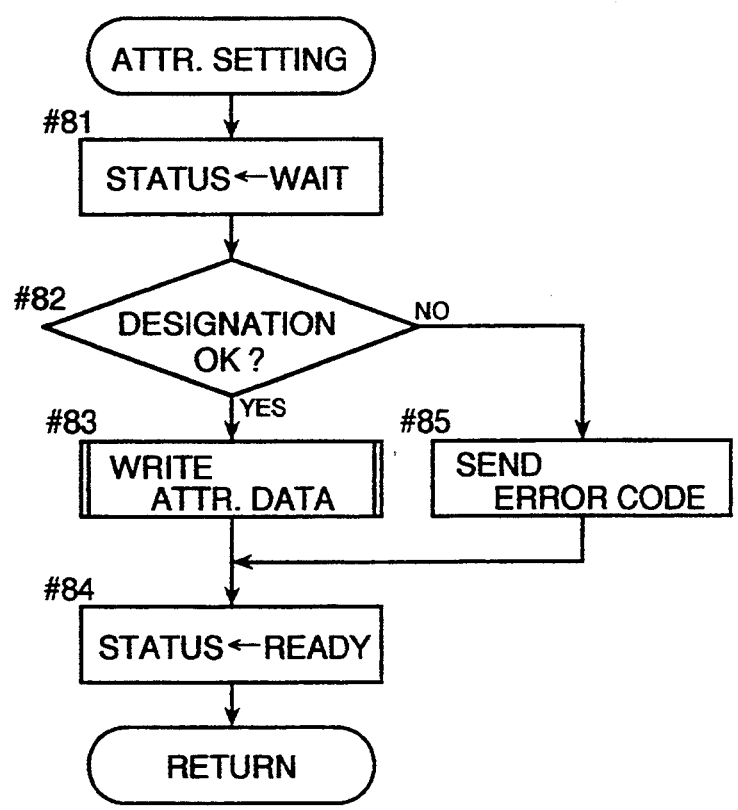

FIG. 18 is a flowchart of the attribute setting carried out at step #6 in FIG. 11.

First, "wait" is set to the status (step #81), and validity of a designation is checked (step #82).

If the designation is incorrect, e.g. an area outside a reading range is designated or there is an error in the order of designation of coordinates, the program moves to step #82 to transmit the error code to the host apparatus.

If the designation is correct, attribute data write processing is carried out to write the designated attribute data a0, a1 and a2 to the attribute memory 30 (step #83). Then, "ready" is set to the status (step #84).

Figure 19:
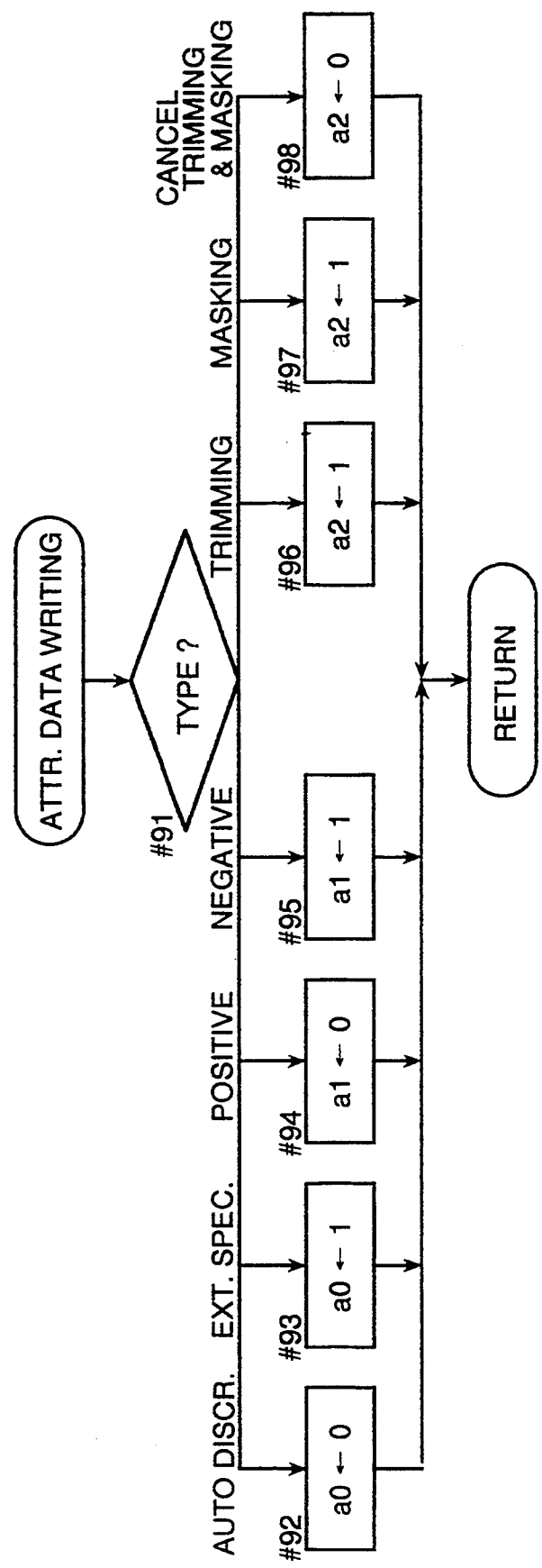

FIG. 19 is a flowchart of the attribute data writing process carried out at step #83.

The type of command from the host apparatus is checked at step #91, and various processes are carried out at steps #92 through #98 according to the types thereof.

When an automatic discrimination of binary attributes is specified, step #92 is executed to set the specified attribute data a0 to "0" for a specified segmented area E.

If binary attributes are specified in advance, step #93 is executed to set the specified attribute data a0 to "1" for the specified segmented area E.

When positive, i.e. no black and white reversal, is specified, step #94 is executed to set the specified attribute data a1 to "0" for the specified segmented area E. On the other hand, when negative, i.e. the black and white reversal, is specified, step #95 is executed to set the specified attribute data a1 to "1" for the specified segmented area E.

When trimming is specified, step #96 is executed to set the specified attribute data a2 to "1" for the specified segmented area E. When masking is specified, step #97 is executed to set the specified attribute data a2 to "1" for the specified segmented area E.

When cancellation of trimming/masking is specified, step #98 is executed to set the specified attribute data a2 back to "0" for the specified segmented area E.

Figure 20:
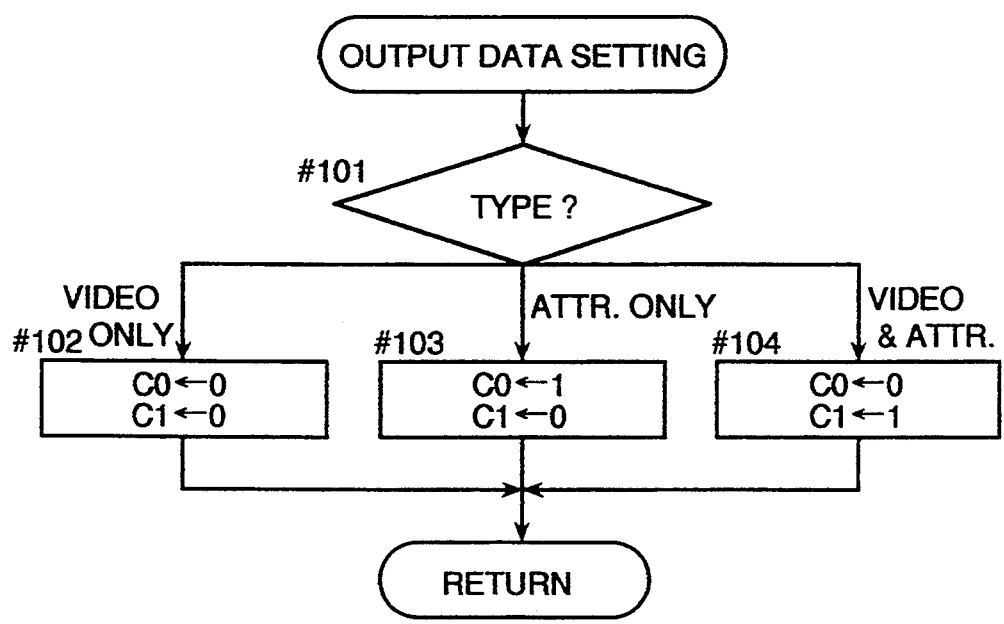

FIG. 20 is a flowchart of the output data setting process carried out at step #7 in FIG. 11.

In this routine, the type of output data DATA is checked first at step #101, and steps #102 through #104 are executed according to the type.

When output of only the video data VIDEO1-8 is selected, step #102 is executed to set both the output control data C0 and C1 to "0".

When output of only the attribute data a4-0 is selected, step #103 is executed to set the output control data C0 to "1" and output control data C1 to "0".

When output of both the video data VIDEO1-8 and attribute data a4-0 is selected, step #104 is executed to set the output control data C0 to "0" and output control data C1 to "1".

Figure 21:
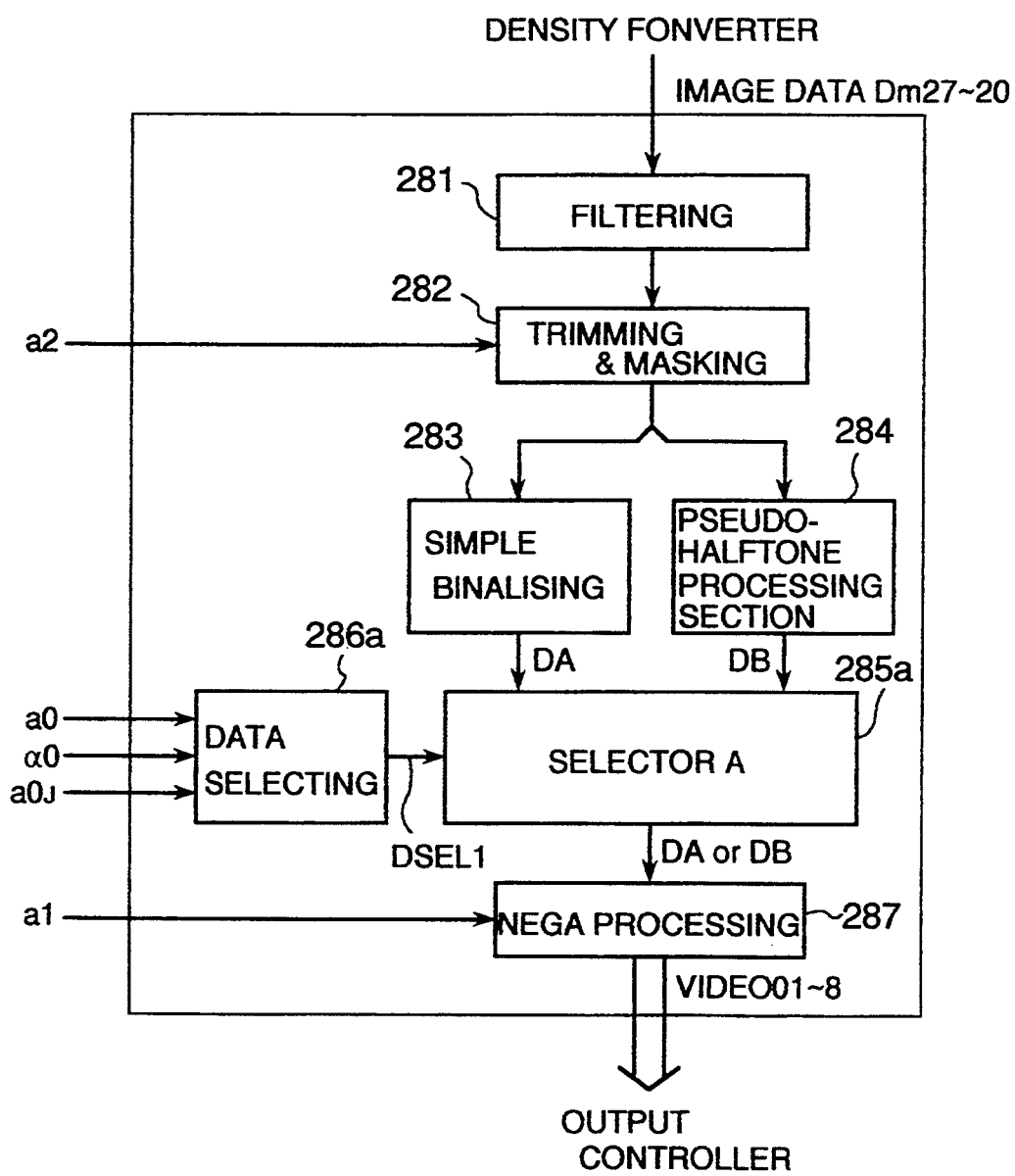
FIG. 21 is a block diagram of a modified image processor.

FIG. 21 is a block diagram of a modified image processor 28a.

In this drawing, like components are labeled with like references with respect to FIG. 7, and their description will not be repeated.

The modified construction shown employs specified attribute data a3 for indicating the data to which priority is given, specified attribute data for specifying the binarizing process in the foregoing embodiment, and discriminated attribute data a0. Consequently, the attribute data output controller 30 in this example, though not shown in the drawing, outputs 6-bit attribute data a5-a0J combining the discriminated attribute data a0 and a1 and specified attribute data a0J, a1, a2 and a3.

The attribute data a5 and a4 correspond to the discriminated attribute data a0 and a1, respectively.

The image processor 28a includes a selector 285a and a data selecting section 286a in place of the selector 285 and data selecting section 286 in the image processor 28 shown in FIG. 7.

The data selecting section 286a receives the discriminated attribute data a0, and specified attribute data a0J specifying binary attributes for each segmented area E, both as optional inputs, as well as the specified attribute data a3 for controlling output selection.

When the value of specified attribute data a3 is "0", priority is given to the discriminated attribute data a0 which is output as output data DSEL1. Conversely, when the value of specified attribute data a3 is "1", priority is given to the specified attribute data a0J which is output as output data DSEL1.

The selector 285a selectively outputs one of the binary data DA and DB in accordance with the value of the output data DSEL1 from the data selecting section 286a.

That is, by storing the specified attribute data a3 in the attribute memory 30, the image processor 28a can select between automatic binarizing processing based on the result of discrimination by the image discriminator 28 and externally specified binarizing processing based on the binary attributes specified from outside.

Figure 22:
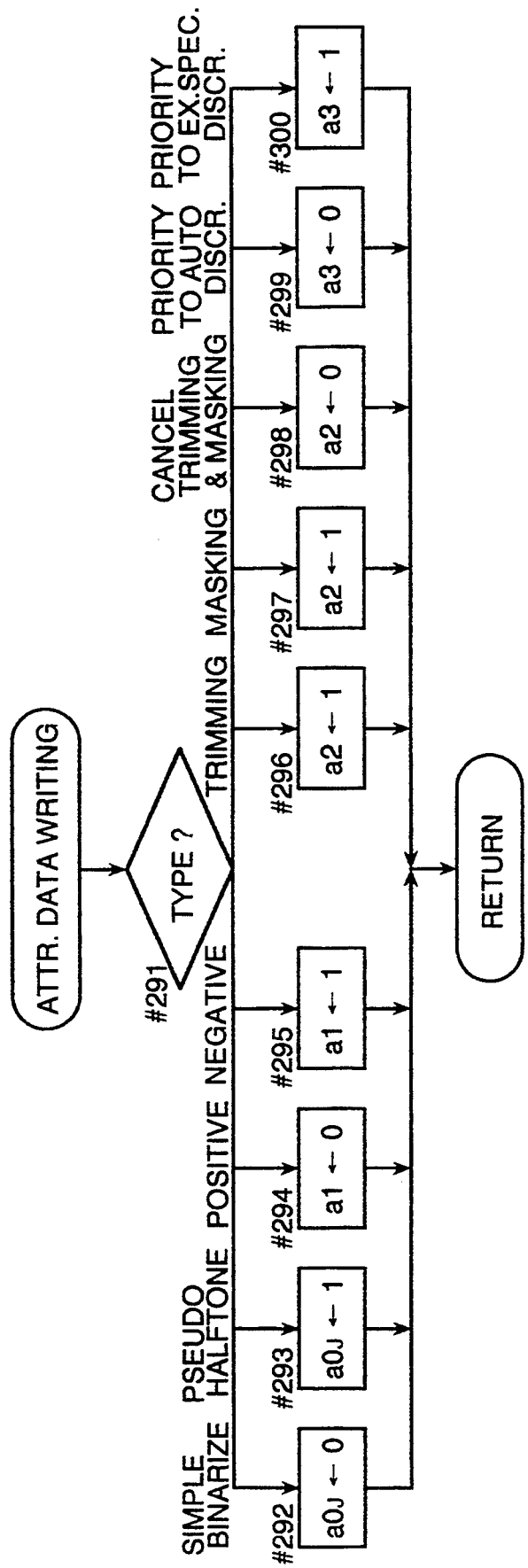
FIG. 22 is a flowchart of an attribute data writing process carried out by the image processor shown in FIG. 21.

FIG. 22 is a flowchart of an attribute data writing process carried out in the modified example.

FIG. 22 corresponds to the image processor 28a in FIG. 21.

The type of command from the host apparatus is checked at step #291, and various processes are carried out at steps #292 through #300 according to the types thereof. Steps #294 through #298 are identical to steps #94 through 98 in FIG. 19 and their description will not be repeated.

When the simple binary processing is specified, step #292 is executed to set the specified attribute data a0J to "0" for a specified segmented area E. When the pseudo-halftone processing is specified, step #293 is executed to set the specified attribute data a0J to "1" for the specified segmented area E.

When the automatic discrimination of the binary processing (discriminated attribute data a0) is given priority, step #299 is executed to set the specified attribute data a3 to "0" for the specified segmented area E. When the discrimination of the binary processing (discriminated attribute data a0J) based on an external specification is given priority, step #300 is executed to set the specified attribute data a3 to "1" for the specified segmented area E.

According to the foregoing embodiment and modified example, the discriminated attribute data a0 according to the result of discrimination of the binary attributes is output. Consequently, character recognition at the host apparatus has improved efficiency since recognizing processing is carried out only for the segmented area E corresponding to a character image based on the discriminated attribute data a0. When the image reader 1 is used with a filing system or a facsimile machine, data processing such as data compression of the video data VIDEO1-8 suited to line images or halftone images may be carried out based on the discriminated attribute data a0.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image data processing apparatus for outputting image data to an external device, comprising:
   generating means for generating attribute data indicative of information relating to image data processing based on image data representing at least one pixel included in a predetermined area;
   processing means for processing the image data based on said attribute data; and
   output means for outputting the processed image data and said attribute data to the external device.

2. An image data processing apparatus as claimed in claim 1, wherein said generating means is operable to determine whether the image of said predetermined area includes or excludes a halftone image said attribute data including an image processing command for images excluding halftones, and another image processing command for images including halftones.

3. An image data processing apparatus as claimed in claim 1, wherein said attribute data include a masking command for indicating to said processing means that said predetermined area is a masking area.

4. An image data processing apparatus as claimed in claim 1, wherein said attribute data include a negative/positive command.

5. An image data processing apparatus as claimed in claim 1, wherein said attribute data include a result of some color discrimination indicating whether said predetermined area is dominated by a particular color.

6. An image data processing apparatus for outputting image data to an external device, comprising:
   generating means for generating attribute data indicative of information relating to image data processing based on image data representing at least one pixel included in a predetermined area;
   processing means for processing the image data based on said attribute data; and
   output means operable in a first, a second and a third operating mode, said output means outputting only the processed image data to the external device when in the first operating mode, only said attribute data to the external device when in the second operating mode, and both said processed image data and said attribute data to the external device when in the third operating mode.

7. An image data processing apparatus for outputting image data to an external device, comprising:
   memory means for storing a first attribute data indicative of information relating to image processing, said first attribute data being set each predetermined area including at least one pixel indicated by said image data;

generating means for generating a second attribute data indicative of information relating to the image data processing based on the image data representing said pixel included in said predetermined area;

processing means for processing the image data based on at least one of said first attribute data and said second attribute data; and output means for outputting the processed image data and said second attribute data to the external device.

8. An image data processing apparatus as claimed in claim 7, wherein said output means alternately outputs image data corresponding to said predetermined area and said second attribute data.

9. An image data processing apparatus as claimed in claim 7, wherein said output means outputs also said first attribute data with said second attribute data.

10. An image data processing apparatus as claimed in claim 7, wherein said second attribute data include an image processing command for an image excluding halftones, and an image processing command for an image including halftones.

11. An image data processing apparatus comprising:
generating means for generating attribute data indicative of information relating to image data processing based on image data representing at least one pixel included in a predetermined area;
memory means for storing designated data for said predetermined area; and
processing means for carrying out image data processing for said predetermined area, which processing is different from the data processing based on said attribute data when said designated data for said predetermined area is in a particular condition.

12. An image data processing apparatus comprising:
first memory means for storing a first attribute data indicative of information relating to image processing, said first attribute data being set for each predetermined area including at least one pixel indicated by said image data;
generating means for generating a second attribute data indicative of information relating to the image data processing based on the image data representing said pixel included in said predetermined area;
second memory means for storing priority designating data set for said each predetermined area, said priority designating data being in a first state when giving priority to said first attribute data, and a second state when giving priority to said second attribute data; and
processing means for carrying out image date processing for said predetermined area, which processing is based on said first attribute data when said priority designating data for said predetermined area is in said first state, and on said second attribute data when said priority designating data for said predetermined area is in said second state.

13. An image data processing apparatus comprising:
image data segmenting means for segmenting image data into areas each including at least one pixel;
checking means for checking whether an image of each of segmented areas includes halftones based on the image data:
image processing mode setting means, operable in response to a result provided by said checking means, for assigning one of a first image processing mode command for an image excluding halftones and a second image processing mode command for an image including halftones to each of said segmented areas; and
image processing means for processing the image data for each of said segmented areas in response to one of said image processing mode commands assigned by said image processing mode setting means, and outputting the processed image data and the assigned image processing mode command to an external device.

14. An image data processing apparatus as claimed in claim 13, further comprising means for setting a priority in choosing between said first and second image processing mode commands, and wherein said image processing mode setting means is further operable independently of said result provided by said checking means.

15. An image data processing apparatus as claimed in claim 14, wherein said image processing mode setting means is further operable to set a masking command for indicating to said processing means that said predetermined area is a masking area.

16. An image data processing apparatus as claimed in claim 14, wherein said further image processing mode setting means is operable to set a negative/positive selecting command.

17. An image data processing apparatus as claimed in claim 13, wherein said checking means is operable to carry out detection based on density variations of edge components of each of said segmented areas in order to determine whether the area to be a halftone area when an amount of edge detection is less than a predetermined threshold level or and a character area when the amount of edge detection is greater than said predetermined threshold level.

18. An image data processing apparatus comprising:
receiving means for receiving color data separated into three color components;
color discrimination means for receiving of two of the three color components and discriminating a color of an area including at least one pixel based on said color data of the two color components and generating discrimination data; and
output means for receiving color data of the one color component not used in the color discrimination means and the discrimination data generated by said color discrimination means and outputting the color data of the one color component together with the discrimination data in synchronism with each other.

19. An image data processing apparatus as claimed in claim 18, wherein said color data include red data, green data and blue data.

20. An image data processing apparatus as claimed in claim 19, wherein said color discrimination means discriminates a color of the area based on the red data and the blue data.

21. An image data processing apparatus as claimed in claim 20, wherein said output means outputs the green data and the discrimination data.

22. A color image reader comprising:
reading means for reading an image of an original and generating color data separated into three color components;
color discrimination means for receiving color data of two of the three color components and discriminating a color of an area including at least one pixel based on said color data of the two color components generated by said reading means and generating discrimination data; and output means for receiving color data of the one color component not used in the color discrimination means and the discrimination data generated by said color discrimination means and outputting the color data of the one color component together with the discrimination data in synchronism with each other.

23. An image data processing apparatus as claimed in claim 22, wherein said color data include red data, green data and blue data.

24. An image data processing apparatus as claimed in claim 23, wherein said color discrimination means discriminates a color of the area based on the red data and the blue data.

25. An image data processing apparatus as claimed in claim 24, wherein said output means outputs the green data an the discrimination data.

26. An image data processing apparatus comprising:
receiving means for receiving red, green and blue data;

color discrimination means for discriminating whether a color of an area including at least one pixel is a specific color or not based on the red and blue data received by said receiving means and generating discrimination data; and outputting means for receiving the green data received by said receiving means and the discrimination data generated by said color discrimination means and outputting the green data together with the discrimination data in synchronism with each other.

27. An image data processing apparatus as claimed in claim 26, wherein said specific color is red.

* * * * *